United States Patent
Duan et al.

(10) Patent No.: US 11,329,913 B2
(45) Date of Patent: May 10, 2022

(54) AVOIDING ASYMETRIC ROUTING IN AN SDWAN BY DYNAMICALLY SETTING BGP ATTRIBUTES WITHIN ROUTING INFORMATION ADVERTISED BY AN SDWAN APPLIANCE

(71) Applicant: Fortinet, Inc., Sunnyvale, CA (US)

(72) Inventors: Shangwei Duan, Vancouver (CA); Xin Gu, Delta (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/830,892

(22) Filed: Mar. 26, 2020

(65) Prior Publication Data

US 2021/0306261 A1 Sep. 30, 2021

(51) Int. Cl.
*H04L 45/00* (2022.01)
*H04L 43/10* (2022.01)
*H04L 45/02* (2022.01)

(52) U.S. Cl.
CPC .............. *H04L 45/56* (2013.01); *H04L 43/10* (2013.01); *H04L 45/02* (2013.01); *H04L 45/04* (2013.01)

(58) Field of Classification Search
CPC ......... H04L 45/56; H04L 45/04; H04L 45/02; H04L 43/10; H04L 41/08; H04L 41/0803; H04L 41/12
See application file for complete search history.

(56) References Cited

U.S. PATENT DOCUMENTS

| 8,139,572 | B1* | 3/2012 | Distler .................. H04L 45/04 370/389 |
| 10,938,716 | B1* | 3/2021 | Chin ...................... H04L 45/64 |
| 2019/0089620 | A1* | 3/2019 | Hefei ...................... H04L 45/02 |
| 2019/0098046 | A1* | 3/2019 | Schlamp ................ H04L 45/04 |
| 2020/0059492 | A1* | 2/2020 | Janakiraman .......... H04L 12/46 |
| 2020/0195557 | A1* | 6/2020 | Duan ...................... H04L 45/02 |
| 2021/0058284 | A1* | 2/2021 | Chandramohan ... H04L 41/0668 |

(Continued)

OTHER PUBLICATIONS

Cisco Systems, Inc. "Border Gateway Protocol routers", 8 pages.
(Continued)

*Primary Examiner* — Min Jung
(74) *Attorney, Agent, or Firm* — Law Office of Dorian Cartwright; Dorian Cartwright

(57) ABSTRACT

Systems and methods are described for automatically controlling network routing between downstream side and upstream side of a communication network to enforce symmetric routing. According to one embodiment, a Software-Defined Wide Area Network (SDWAN) controller of a network device associated with a spoke site of an SDWAN manages links forming the SDWAN. The controller receives information regarding route maps, including a preferred route-map and an un-preferred route-map. Further, the controller configures a local BGP daemon with the route maps to exchange routing information including a BGP attribute with the BGP peers and selects a link on which network traffic is to be transmitted. The controller causes the BGP daemon to (i) use the preferred route-map to advertise the routing information to the BGP peer associated with the selected link, and (ii) use the un-preferred route-map to advertise the routing information to a remainder of the BGP peers.

20 Claims, 9 Drawing Sheets

(56) References Cited

U.S. PATENT DOCUMENTS

2021/0112034 A1* 4/2021 Sundararajan ...... H04L 41/0823

OTHER PUBLICATIONS

Cisco Systems, Inc. "Using BGP Community Values to Control Routing Policy in an Upstream Provider Network", Document ID: 28784, updated Aug. 10, 2005, 13 pages.
Forcepoint, "What is Asymmetric Routing?", https://my.stonesoft.com/support/document.do?docid=1377, downloaded Oct. 15, 2019, 4 pages.
Srisuresh, P. et al., "IP Network Address Translator (NAT) Terminology and Considerations", Lucent Technologies, Aug. 1999, 30 pages.
Sangli, S. et al., "BGP Extended Communities Attribute", Cisco Systems, Feb. 2006, 12 pages.

* cited by examiner

400 ⟶

```
CONFIG ROUTER ROUTE-MAP
   EDIT "PREFER-CONNECTION"
      CONFIG RULE
         EDIT 1
            SET SET-COMMUNITY "1-120"
         NEXT
      END
   NEXT
   EDIT "UNPREFER-CONNECTION"
      CONFIG RULE
         EDIT 1
            SET SET-COMMUNITY "1-100"
         NEXT
      END
   NEXT
END
```

```
CONFIG ROUTER BGP
   SET AS 30
   SET EBGP-MULTIPATH ENABLE
      CONFIG NEIGHBOR
      EDIT "10.10.13.1"        (CONNECTING TO ISP A)
         SET NEXT-HOP-SELF ENABLE
         SET REMOTE-AS 100
         SET ROUTE-MAP-OUT "UNPREFER-CONNECTION"   (EXISTING CLI FOR NON-PREFERRED ROUTE-MAP.)
         SET ROUTE-MAP-OUT-PREFERABLE "PREFER-CONNECTION" (NEW CLI FOR PREFERRED ROUTE-MAP.)
      NEXT
      EDIT "10.10.23.2"        ( CONNECTING TO ISP B)
         SET NEXT-HOP-SELF ENABLE
         SET REMOTE-AS 100
         SET ROUTE-MAP-OUT "UNPREFER-CONNECTION"  (EXISTING CLI FOR NON-PREFERRED ROUTE-MAP.)
         SET ROUTE-MAP-OUT-PREFERABLE "PREFER-CONNECTION" (NEW CLI FOR PREFERRED ROUTE-MAP.)
      NEXT
END
```

```
CONFIG SYSTEM VIRTUAL-WAN-LINK
   CONFIG NEIGHBOR
      EDIT "10.10.13.1"
         SET MEMBER 1
         SET ROLE PRIMARY
         SET HEALTH-CHECK "HC"
         SET SLA-ID 1
      NEXT
      EDIT "10.10.23.2"
         SET MEMBER 2
         SET ROLE SECONDARY
         SET HEALTH-CHECK "HC"
         SET SLA-ID 1
      NEXT
   END
END
```

```
CONFIG ROUTER ROUTE-MAP
   EDIT "SDWAN-HUB-1"
      CONFIG RULE
         EDIT 1
            SET MATCH-COMMUNITY "1-120"
            SET SET-LOCAL-PREFERENCE 120
         NEXT
         EDIT 2
            SET MATCH-COMMUNITY "1-100"
            SET SET-LOCAL-PREFERENCE 100
         NEXT
      END
   NEXT
END

CONFIG ROUTER BGP
   SET AS 100
   SET EBGP-MULTIPATH ENABLE
   CONFIG NEIGHBOR
      EDIT "10.10.13.2"
         SET NEXT-HOP-SELF ENABLE
         SET SOFT-RECONFIGURATION ENABLE
         SET REMOTE-AS 30
         SET ROUTE-MAP-IN "SDWAN-HUB-1"
      NEXT
      EDIT "10.10.23.1"
         SET NEXT-HOP-SELF ENABLE
         SET SOFT-RECONFIGURATION ENABLE
         SET REMOTE-AS 30
         SET ROUTE-MAP-IN "SDWAN-HUB-1"
      NEXT
   END
```

```
# GET ROUTER INFO BGP NETWORK
BGP TABLE VERSION IS 5, LOCAL ROUTER ID IS 10.10.2.254
STATUS CODES: S SUPPRESSED, D DAMPED, H HISTORY, * VALID, > BEST, I - INTERNAL,
        S STALE
ORIGIN CODES: I - IGP, E - EGP, ? - INCOMPLETE

NETWORK       NEXT HOP        METRIC LOCPRF WEIGHT ROUTETAG PATH
*> 1.1.1.0/24   192.168.1.232      0   120    0      0        5000 I
*                192.168.14.232    0   100    0      0        5000 I
```

```
FOR EACH NEIGHBOR OF SD-WAN {
    IF (NEIGHBOR'S ROLE IS PRIMARY
&& NEIGHBOR'S QUALITY HAS PASSED SLA THRESHOLD ) {      SELECTION = PRIMARY;
        GOTO SEND_COMMAND;
    }
}
FOR EACH NEIGHBOR OF SD-WAN {
    IF (NEIGHBOR'S ROLE IS SECONDARY
&& NEIGHBOR'S QUALITY HAS PASSED SLA THRESHOLD ) {      SELECTION = SECONDARY;
        GOTO SEND_COMMAND;
    }
}
SEND_COMMAND:
FOR EACH NEIGHBOR OF SD-WAN {
   IF (SELECTION == PRIMARY) {
       IF (NEIGHBOR'S ROLE IS PRIMARY)
            SEND_COMMAND_TO_BGP(NEIGHBOR, PREFERRED_ROUTE_MAP);
       ELSE
            SEND_COMMAND_TO_BGP(NEIGHBOR, UNPREFERRED_ROUTE_MAP);
   } ELSE {
       IF (NEIGHBOR'S ROLE IS PRIMARY)
            SEND_COMMAND_TO_BGP(NEIGHBOR, UNPREFERRED_ROUTE_MAP);
       ELSE
            SEND_COMMAND_TO_BGP(NEIGHBOR, PREFERRED_ROUTE_MAP);
   }
}
```

FIG. 5A

```
BGP DAEMON:
IF (RECEIVED NEIGHBOR IS PREFERRED)
     NEIGHBOR->IS_PREFERRED = 1;
ELSE
     NEIGHBOR->IS_PREFERRED = 0;
```

FIG. 5B

```
FOR EACH SUBNET ADVERTISED TO A NEIGHBOR {
IF (NEIGHBOR->IS_PREFERRED)
ROUTE_MAP_APPLY(PREFERRED_ROUTE_MAP, SUBNET)
     ELSE
          ROUTE_MAP_APPLY(UNPREFERRED_ROUTE_MAP, SUBNET)
}
```

FIG. 5C

AVOIDING ASYMETRIC ROUTING IN AN SDWAN BY DYNAMICALLY SETTING BGP ATTRIBUTES WITHIN ROUTING INFORMATION ADVERTISED BY AN SDWAN APPLIANCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to the field of Software-Defined Wide Area Networks (SD-WANs). In particular, embodiments of the present invention relate to a Software-Defined Wide Area Network (SDWAN) controller that causes appropriate Border Gateway Protocol (BGP) attribute values to be included within routing information that is advertised to upstream BGP peers to control network routing between a downstream side and an upstream side of an SDWAN to prevent asymmetric routing.

Description of the Related Art

A Software-Defined Wide Area Network (SDWAN) is a software-defined approach to manage operation of a Wide Area Network (WAN). An SDWAN controller congregates parallel links to offer intelligent load balance schemes for low latency, jitter and failure recovery for the WAN. However, sometimes the existence of parallel links results in asymmetric routing, a situation where a packet traverses one path from a source to a destination and takes a different path while returning traffic from the destination to the source. Such asymmetric routing is generally undesired for stateful-based network functionalities such as proxy forwarding, stateful Intrusion Detection System (IDS) and Intrusion Prevention System (IPS) analysis (which often employs stateful packet inspection), stateful firewall filtering (which tracks the operating state and characteristics of network connections traversing the firewall), and the like.

FIG. 1 illustrates routes between a hub and a spoke in the context of a simplified view of an SDWAN with reference to which various prior art approaches for addressing asymmetric routing issues are described. With reference to FIG. 1, an SDWAN controller 106 includes two interfaces, interface A and interface B, to allow traffic from client 102 (at a spoke site) to server 116 (at a hub site) to follow either of two paths (i.e., a first path via Internet Service Provider (ISP) A 108 and a second path via ISP B 110). Assuming the path from interface A to Router C 114 via ISP A has a better link quality than the path from interface B to router C 144 through via ISP B, the SD-WAN controller 106 selects interface A to forward network traffic from client 102 to server 116. Unfortunately, when the response from server 116 reaches Router C. 114, which again has two routes to client 102, an asymmetric route (i.e. via ISP B 110) may be selected. Such asymmetric routing is an undesirable situation for many network devices including, firewalls, proxy devices, and the like. Therefore, with the rapid growth of SDWANs, network engineers are pursuing effective solutions to avoid asymmetric routing.

One technique for avoiding asymmetric routing involves the use of Source Network Address Translation (SNAT). With reference to FIG. 1, when network traffic is transmitted from ISP A 108 to Router C, in accordance with the SNAT approach, the source IP address is translated to the IP address of interface P of ISP A 108. Therefore, return traffic is routed back to interface P of ISP A 108, and then forwarded to Interface A of SDWAN controller 106 to avoid asymmetric routing. Alternately, SNAT can take place on interface A of SD-WAN controller 106. However, SNAT is usually applied to hide private network IP addresses from the outside network and cannot be used to connect two public networks. Therefore, SNAT cannot address the asymmetric routing issues for all scenarios.

Another technique to avoid asymmetric routing is to leverage router C 114 by adding a stateful feature. For example, router C 114 may establish a session table to remember the source of the traffic passing through it so that the return traffic can follow the original route. The main limitation of this technique is the maintenance of the session table itself. In fact, for better flexibility and reach ability, IP packet switching based routers usually do not maintain such a table.

Yet another technique has been developed for instances in which the network devices exchange routing information through Border Gateway Protocol (BGP). This technique controls routing selection of upstream routers by manually changing a BGP community value. With reference to FIG. 1, firewall 104 exchanges routing information with ISP A 108 and ISP B 110, and ISP A 108 or ISP B 110 exchanges routing information with Router C 114 with BGP as the routing protocol. When ISP A 108 represents the preferred route, firewall 104 advertises a preferred community value to indicate that selection. Since the community value is a transitive attribute, it could reach Router C 114 through intermediate networks or multiple autonomous systems, such as ISP A 108 so that router C 114 knows that the path via ISP A 108 is the better route. Further, with the help of a route-map, the preferred return route is used to forward the return traffic and asymmetric routing is prevented. A limitation of this approach is its reliance on an administrator to manually update the BGP community value each time the SDWAN controller dynamically selects a new route. As such, this process is tedious, complex and error prone, requiring the administrator to continually monitor the state of the SDWAN or risk traffic traversing suboptimal paths.

SUMMARY

Systems and methods are described for automatically controlling network routing between downstream side and upstream side of a communication network to enforce symmetric routing. According to one embodiment, a Software-Defined Wide Area Network (SDWAN) controller of a network device associated with a spoke site of an SDWAN manages multiple links that form an SDWAN between a first endpoint of the spoke site and a second endpoint of a hub site of the SDWAN. Each of the multiple links is a part of a route between one of several interfaces of the network device and a BGP peer of multiple BGP peers. The SDWAN controller receives information regarding various route maps that includes a preferred route-map having a first value for a BGP attribute and an un-preferred route-map having a second value for the BGP attribute. The SDWAN controller configures a local BGP daemon running on the network device with the various route maps. The local BGP daemon exchanges routing information with the multiple BGP peers and the routing information includes the BGP attribute. The SDWAN controller selects a link of the multiple links. Network traffic is then transmitted from the first endpoint to the second endpoint over the selected link. Responsive to selection of the link, the SDWAN controller causes the BGP daemon to (i) use the preferred route-map in connection with advertising the routing information to the BGP peer associated with the selected link, and (ii) use the un-preferred route-map in connection with advertising the routing information to a remainder of the BGP peers of the multiple BGP peers.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4A is pseudo code representing the definition of two route-maps for each BGP peer in accordance with an embodiment of the present invention.

FIG. 4B is pseudo code representing application of two route-maps to BGP peers in accordance with an embodiment of the present invention.

FIG. 4C is pseudo code representing the introduction of BGP peers into the SDWAN configuration of a downstream SDWAN device as network neighbors in accordance with an embodiment of the present invention.

FIG. 4D represents pseudo code examples for configuring an upstream SDWAN device in accordance with an embodiment of the present invention.

FIG. 5A is pseudo code for selection by a downstream SDWAN device of a neighbor in an SDWAN and configuration of BGP with a selected route-map in accordance with an embodiment of the present invention.

FIG. 5B is pseudo code for storing by a BGP daemon of a downstream SDWAN device whether a specific neighbor is preferred or not in accordance with an embodiment of the present invention.

FIG. 5C is pseudo code for advertising routing information by a BGP daemon of a downstream SDWAN device in accordance with an embodiment of the present invention.

DETAILED DESCRIPTION

Figure 1:
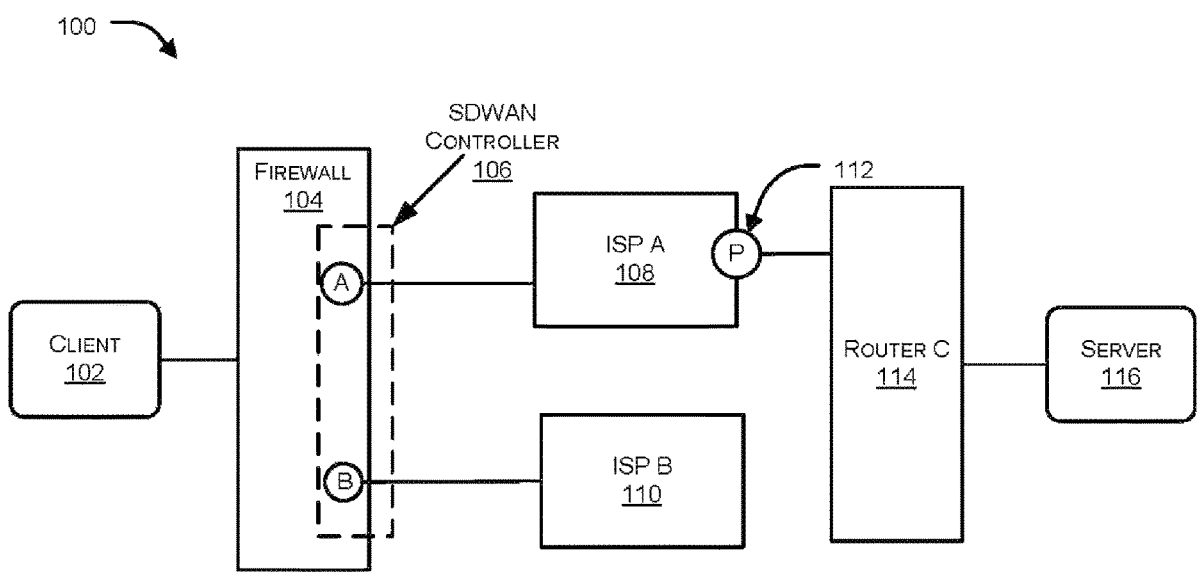
FIG. 1 illustrates routes between a hub and a spoke in the context of a simplified view of an SDWAN with reference to which various prior art approaches for addressing asymmetric routing issues are described.

Systems and methods are described for automatically controlling network routing between a hub and a spoke site of a Software-Defined Wide Area Network (SDWAN) to enforce symmetric routing. Embodiments described herein seek to address various limitations described above in the Background by, among other things, facilitating automatic update of BGP attribute values for preferred and un-preferred routes based on the use of a dual outgoing route-map mechanism, including a preferred route-map containing a first community value and an un-preferred route-map containing a second community value, and a new communication channel between the SDWAN controller and the BGP module.

For example, as described further below, in one embodiment, when the SDWAN controller selects a preferred route, it may notify the BGP module of the selected BGP peer to cause the preferred route-map to be used for the selected BGP peer and the un-preferred route-map to be used for other BGP peers. As the different route-maps contain different community values that will be carried by the routing information, the adjusted community values will be advertised to the upstream devices. On the upstream devices, an incoming route-map may be defined to allow different community values to be translated to different local preference values (e.g., mapping the community value to a particular service or a particular application).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

The phrase "underlay link" generally refers to a raw transport associated with a physical connection for creating a one to one relationship between underlay interfaces and network devices of a network (e.g., an SDWAN). According to one embodiment, underlay links are data links rented or bought from one or more Internet Service Providers (ISPs) and may include Internet, Multi-Protocol Label Switching (MPLS), and third, fourth, or fifth generation of wireless mobile telecommunications technology (3G, 4G, or 5G) or Long Term Evolution (LTE) links.

The phrase "overlay link" generally refers to a logical or virtual tunnel built on top of the underlay links. According to one embodiment, the overly links may be used to create a one-to-many relationship between a network device and overlay interfaces of a private network. In one embodiment, overlay links are used to form an IPSec secured connection between two SDWAN devices (e.g., network security devices operating as hub or spoke SDWAN gateways).

As used herein, the term "upstream" when used to refer to an SDWAN device/appliance generally refers to that device's logical or physical position relative to another SDWAN device/appliance and relative to a hub and a spoke of a hub-spoke network topology. For example, from the perspective of an SDWAN device/appliance (e.g., a router, a firewall or UTM appliance) associated with a spoke any intermediate device between it and the hub is considered an "upstream" device or associated with the "upstream side" of the SDWAN.

As used herein, the term "downstream" when used to refer to an SDWAN device/appliance generally refers to that device's logical or physical position relative to another SDWAN device/appliance and relative to a hub and a spoke of a hub-spoke network topology. For example, from the perspective of an SDWAN device/appliance (e.g., a router or a network security device) associated with a hub any intermediate device between it and a spoke hub is considered a "downstream" device or associated with the "downstream side" of the SDWAN.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Figure 2:
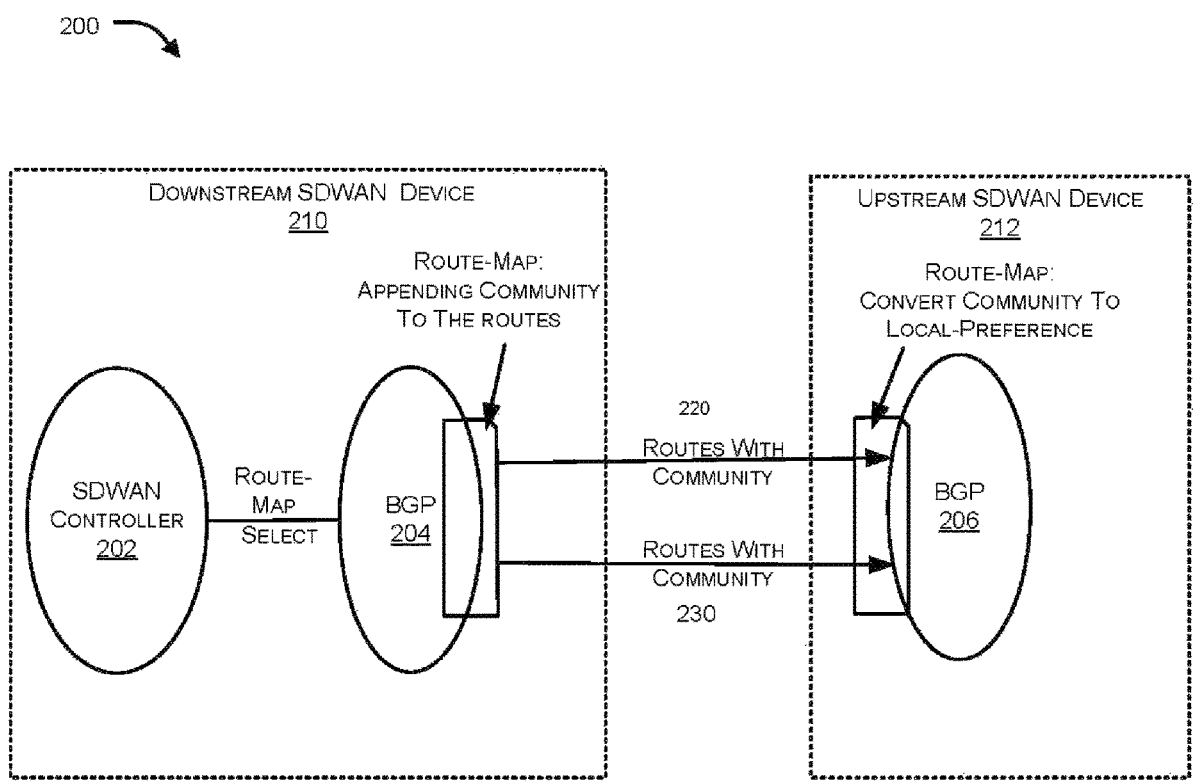
FIG. 2 illustrates a software architecture of a downstream SDWAN device and an upstream SDWAN device in accordance with an embodiment of the present invention.

FIG. 2 illustrates a software architecture 200 of a downstream SDWAN device 210 and an upstream SDWAN device 212 in accordance with an embodiment of the present invention. According to one embodiment, the downstream SDWAN device 210 is a network device (e.g., a router or a network security device) associated with a spoke site (not shown) of a hub-spoke network topology residing "downstream" from the hub site (not shown) of the hub-spoke network topology. Similarly, the upstream SDWAN device 212 is a network device (e.g., a router or a network security device) logically or physically interposed between the downstream SDWAN device 210 and the hub site. The upstream SDWAN device 212 may be an intermediate network device (e.g., an SDWAN-enabled router) between the downstream SDWAN device 210 and the hub site or a may be a network security device within the hub site and protecting the hub site.

In the context of the present example, an SDWAN controller 202 (which may be referred to simply as controller 202, hereinafter) is implemented within the downstream SDWAN device. Controller 202 may be associated with a spoke site of an SDWAN, for example, as a result of the spoke site being protected by the network security device in which the controller 202 is implemented. Controller 202 manages multiple links (e.g., link 220 and link 230) that form the SDWAN between a first endpoint of the spoke site and a second endpoint of a hub site of the SDWAN. The multiple links 220 and 230 are each part of a route between a particular interface of the downstream SDWAN device 210 and particular interface of a BGP peer (e.g., upstream SDWAN device 212).

In the present example, two links 220 and 230 are shown. The top link 220 between a first interface of downstream SDWAN device 210 and a first interface of upstream SDWAN device 212 may be through a first ISP (not shown), whereas the bottom link 230 between a second interface of downstream SDWAN device 210 and a second interface of upstream SDWAN device 212 may be through a second ISP (not shown).

Controller 202 may receive multiple outgoing route-maps (e.g., from a configuration file or from a network administrator). One of the route-maps is a preferred route-map having a first value for a BGP attribute, and another route-map is an un-preferred route-map having a second value for the BGP attribute. The BGP attribute may be a BGP community attribute.

In an embodiment, controller 202 configures a local BGP daemon 204 running on the downstream SDWAN device 210 with the multiple route-maps. Controller 202 communicates with BGP daemon 204 through an inter-process communication mechanism (e.g., a socket). The BGP daemon 204 is operable to exchange routing information, including the BGP attribute, with a remote BGP daemon 206 running on the upstream SDWAN device 212.

In one embodiment, controller 202 is responsible for, among other things, selecting a link among the multiple available links (e.g., the top link 220 and the bottom link 230) that form a part of a route between one of multiple interfaces of the downstream SDWAN device 210 and the upstream SDWAN device 212. For example, the controller 202 may periodically perform a health check of each of the multiple links and select the link that is expected to provide the best performance for delivery of network traffic between the spoke site and the hub site.

As described further below, in various embodiments, responsive to the link/route selection the controller 202 communicates the route-map selection to the BGP daemon 204, which causes the BGP daemon to advertise routing information containing the appropriate BGP attribute values on the multiple links 220 and 230. For example, assuming the top link 220 is selected by the SDWAN controller 210, then, based on the preferred route-map, routing information containing the first value for the BGP attribute may be advertised by BGP daemon 204 on the selected link/route (the top link 220, in this case) and based on un-preferred route-map, routing information containing the second value for the BGP attribute may be advertised by BGP daemon 204 on the other link (the bottom link 230, in this case). As such, the controller 202 causes BGP daemon 204 to (i) use the preferred route-map in connection with advertising the routing information to the BGP peer associated with the selected link, and (ii) use the un-preferred route-map in connection with advertising the routing information to a remainder of the BGP peers of the multiple BGP peers associated with the non-selected link(s). Depending upon the particular implementation, the routing information may be advertised by the BGP daemon 240 periodically, responsive to changes in the selected link/route, and/or responsive to changes in the route-maps.

In an embodiment, responsive to receipt of the advertised routing information from the BGP daemon 204, BGP daemons (e.g., BGP daemon 206) of upstream SDWAN devices (e.g., upstream SDWAN 212), configure their respective local route-maps based on the received routing information to facilitate appropriate routing of upstream and downstream network traffic. For example, BGP daemon 206 may create a mapping of the community value to a particular service or a particular application for purposes of routing upstream network traffic. With respect to the return route for downstream network traffic, as described further below, in one embodiment, since BGP routing involves selecting a route-map having a higher local preference value, the first value assigned to the BGP attribute associated with the preferred route-map should be a higher value than the second value assigned to the BGP attribute associated with the un-preferred route-map. In this manner, the return route selected by the upstream SDWAN device 212 will be the preferred route selected by the controller 202.

Figure 3:
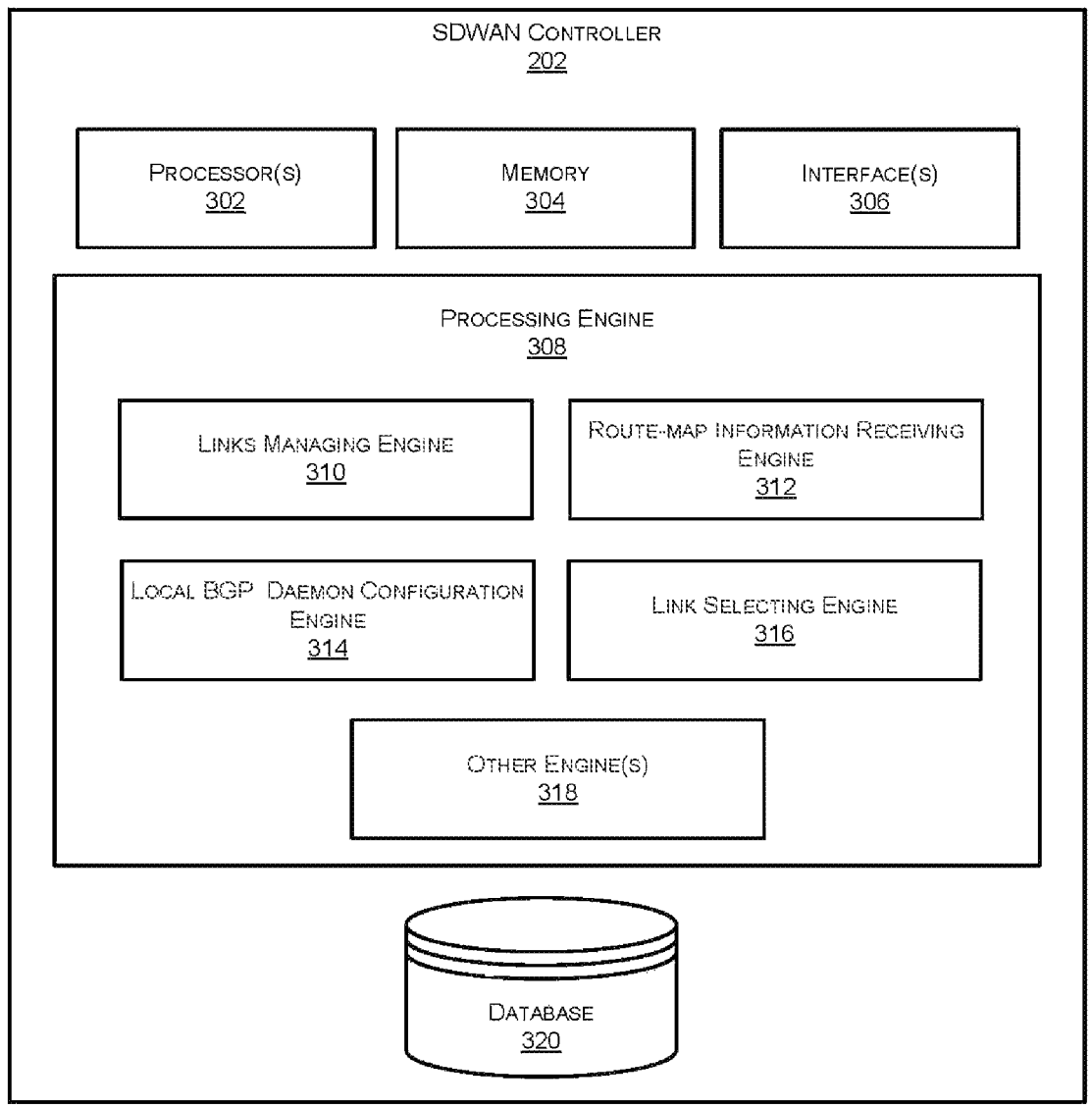
FIG. 3 is a block diagram illustrating functional components of an SDWAN controller in accordance with an embodiment of the present invention.

FIG. 3 is a block diagram illustrating functional components of an SDWAN controller 202 in accordance with an embodiment of the present invention. As noted above, in one embodiment, SDWAN controller 202 is implemented within a network device (e.g., a router or a network security device) associated with a spoke site of an SDWAN. In an embodiment, SDWAN controller 202 facilitates providing an automatic update of BGP attribute values for both preferred routes and un-preferred routes. The automatic update of the BGP attribute values is performed based on use of a dual outgoing route-map mechanism, including a preferred route-map containing a first BGP community value and an un-preferred route-map containing a second BGP community value. In one embodiment, the SDWAN controller 202 communicates with a local BGP module (e.g., BGP daemon 204) running on the network device via an inter-process communication mechanism to inform the local BGP daemon regarding changes to the selected route-map to be associated with different links/routes as a result of changes to the selected route. In this manner, route information advertised by the local BGP daemon on a particular link/route include the BGP community value contained in selected route map (e.g., the preferred route-map or the un-preferred route-map the 204).

In the context of the present example, SDWAN controller 202 or the network device within which it is implemented may include one or more processing resources (e.g., processor(s) 302). Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of SDWAN controller 202. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

SDWAN controller 202 or the network device in which it is implemented may also include one or more Interface(s) 306. Interface(s) 306 may include a variety of interfaces, for example, interfaces for data input and output devices, referred to as I/O devices, storage devices, and the like. Interface(s) 306 may facilitate communication between the SDWAN controller 202 and various devices coupled to SDWAN controller 202. Interface(s) 306 may also provide a communication pathway for one or more components of SDWAN controller 202. Examples of such components include, but are not limited to, processing engine(s) 308 and database 318.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) 308 may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, SDWAN controller 202 can include the machine-readable storage medium storing the instructions and the processing resource to execute the instructions, or the machine-readable storage medium may be separate but accessible to SDWAN controller 202 and the processing resource. In other examples, processing engine(s) 308 may be implemented by electronic circuitry. Database 318 can include data that is either stored or generated as a result of functionalities implemented by any of the components of processing engine(s) 308.

In an example, processing engine(s) 308 can include a links managing engine 310, a route-map information receiving engine 312, a local BGP daemon configuration engine 314, a link selecting engine 316 and other engine(s) 318. Other engine(s) 318 can implement functionalities that supplement applications or functions performed by SDWAN controller 202 or processing engine(s) 308.

According to an embodiment, the links managing engine 310 may manage multiple links that are formed between a first endpoint of a spoke site and second endpoint of a hub site of an SDWAN. The links may be managed by the SDWAN controller 202, which may be implemented within a network device that is associated with a spoke site of the SDWAN. The links may each be part of a route between one of the interfaces of the network device and an upstream BGP peer of multiple upstream BGP peers. As can be seen in the context of the present example, a single upstream SDWAN device (e.g., upstream SDWAN device 212) may serve as a BGP peer for multiple routes originating at the same downstream SDWAN device (e.g., downstream SDWAN device 210). So, in this example, remote BGP daemon 206 represents a BGP peer to local BGP daemon 204 via link 220 and remote BGP daemon 206 also represents a BGP peer to local BGP daemon 204 via link 230. Those skilled in the art will appreciate, in other network topologies, link 220 and link 230 may connect to different upstream SDWAN devices.

According to an embodiment, the route-map information receiving engine 312 may receive information regarding route maps, including a preferred route-map having a first value for a BGP attribute and an un-preferred route-map having a second value for the BGP attribute. As will be appreciated by those skilled in the art, the BGP attribute may be a BGP community attribute. As described further below, the first value of the BGP attribute may be a higher value of the BGP community attribute than the second value for the BGP attribute.

According to an embodiment, the local BGP daemon configuration engine 314 is responsible for configuring the local BGP daemon with the route-maps. For its part, the local BGP daemon may be responsible for exchange routing information, including the BGP attribute, with the multiple BGP peers.

According to an embodiment, the link selecting engine 316 is responsible for periodically selecting a link on which network traffic is transmitted from the first endpoint to the second endpoint, for example, based on the health of the respective links. Responsive to completing the link/route selection, the SDWAN controller may cause the local BGP daemon to (i) use the preferred route-map for advertising routing information to the BGP peer associated with the selected link and (ii) use the un-preferred route-map for advertising routing information to a remainder of the BGP peers.

As a non-limiting example, the preferred route map may carry a BGP attribute value, e.g., a community string of "120," within the advertised routing information sent on the selected link, and the un-preferred route-map may carry a community string of "100" within the advertised routing information sent on the other link(s). Therefore, in the context of the present example, all routing information advertised by the local BGP daemon will include either have a community string "120" or a community string "100". The routing information containing the community string value is transmitted to a BGP peer running on or represented by an upstream SDWAN device. The BGP peer configures local route-maps based on the received routing information to appropriately route upstream and downstream network traffic. For example, for upstream traffic, the local route map may map a route having community string "120" to a local-preference value of 120 and may map a route having community string "100" to a local-preference value of 100. For downstream traffic, the BGP peer may select the return route from the upstream SDWAN device to a downstream SDWAN device by selecting the local route-map having a higher local preference value, for example the route-map may be selected based on a higher local preference value 120.

FIG. 4A is pseudo code 400 representing the definition of two route-maps for each BGP peer in accordance with an embodiment of the present invention. As existing BGP peers only use one outgoing route-map, all routing information they transmit will carry the same information defined by this one route-map. In embodiments of the present invention, a local BGP daemon (e.g., BGP daemon 204) running on the same device as the SDWAN controller (e.g., SDWAN controller 202) is configured by the SDWAN controller with two outgoing route-maps. In this manner, the local BGP daemon has the ability to send two different sets of information. While, in embodiments described herein, the local BGP daemon still uses one outgoing route-map at a time, the current route-map being used by the local BGP daemon can be dynamically changed by the SDWAN controller for each interface or link. In this manner, the SDWAN controller has the ability to control the BGP routing information advocated to BGP peers.

In the context of the present example, pseudo code 400 defines a two different connections, a "Prefer-Connection" and an "Unprefer-Connection." The Prefer-Connection has a community value of "1-120" and the Unprefer-Connection has a community value of "1-100."

FIG. 4B is pseudo code 420 representing application of two route-maps to BGP peers of in accordance with an embodiment of the present invention. The pseudo code 420 represented is used to apply dual route-maps to the BGP peers (e.g., having IP addresses 10.10.13.1 and 10.10.23.2), which as noted above facilitates injection of different information (e.g., community attribute values) by a local BGP daemon into advertised routing information send on each link in accordance with the dynamically changing link/route selected by the SDWAN controller.

As noted above, existing BGP peers only use one outgoing route-map. In the context of the present example, "SET ROUTE-MAP-OUT" represents an existing command line interface (CLI) that was used for setting the traditional single outgoing route-map. This CLI is now used to set the outgoing route-map for the Unprefer-Connection and a new CLI (i.e., "SET ROUTE-MAP-OUT-PREFERABLE") is used to set the outgoing route-map for the Prefer-Connection. This existing the local BGP daemon leading to the BGP peers having a potential ability to send dual information.

FIG. 4C is pseudo code 440 representing the introduction of BGP peers into the SDWAN configuration of a downstream SDWAN device as network neighbors in accordance with an embodiment of the present invention. In pseudo code 440, the BGP peers (having IP addresses 10.10.13.1 and 10.10.23.2, respectively) are introduced into the SDWAN configuration as network neighbors. The neighbor having IP address 10.10.13.1 is set as member 1 and its role is set to primary and the neighbor having IP address 10.10.23.2 is set as member 2 and its role is set to secondary. Additionally, various other parameters may be set for each neighbor, including a health-check parameter (e.g., defining the link quality method to be used to evaluate the health of the route to the neighbor) and an SLA-ID parameter (e.g., defining the threshold for determining an acceptable link quality). In one embodiment, when the health of all potential routes are acceptable, the role of primary or secondary can be used to break the tie.

As an example, when the controller chooses the link/route through the neighbor having IP address 10.10.13.1, the controller may send a first command (e.g., SET ROUTE-MAP-OUT-PREFERRABLE) to a local BGP daemon, instructing the local BGP daemon to use the Prefer-Connection route-map when advertising routing information to that neighbor and may send a second command (e.g., SET ROUTE-MAP-OUT) to the local BGP daemon, instructing the local BGP daemon to use the Unprefer-Connection route-map when advertising routing information to the other neighbor. In this manner, in the context of the present example, the community attribute value of "1-120" will be injected into the routing information advertised to the neighbor having IP address 10.10.13.1 and the community attribute value of "1-100" will be injected into the routing information advertised to the neighbor having IP address 10.10.23.2. Below is an example of the BGP output showing these settings:

get router info bgp neighbors
    BGP neighbor is 10.10.13.1, remote AS 100, local AS 30, external link
    BGP version 4, remote router ID 10.10.2.254
    BGP state=Established, preferable, up for 23:38:44
    . . .
    BGP neighbor is 10.10.23.2, remote AS 100, local AS 30, external link
    BGP version 4, remote router ID 10.10.2.254
    BGP state=Established, up for 23:38:44

As is shown, in the BGP output above, BGP neighbor 10.10.13.1 indicates that the BGP state is established with a preferable flag, and the BGP neighbor 10.10.23.2 only has a BGP state established without the preferable flag.

FIG. 4D represents a pseudo code 460 example for configuring an upstream SDWAN device (e.g., upstream SDWAN device 212) in accordance with an embodiment of the present invention. In the context of the present example, pseudo code 460, includes two different portions. The first portion of pseudo code 460 includes configuration rules to establish a route-map (called "SDWAN-HUB-1") for processing incoming traffic from the downstream side of the SDWAN that maps the community values contained within the incoming traffic to local preference values (e.g., community value "1-120" to a local preference value of 120 and community value "1-100" to a local preference value of 100). The second portion of pseudo code 460, configures the local BGP daemon (e.g., BGP daemon 206) to use the route map ("SDWAN-HUB-1") for each BGP peer (e.g., the neighbor having IP address 10.10.13.2 and the neighbor having IP address 10.10.23.1) to route incoming network traffic received from the BGP peers. In this manner, an automated process is established for dynamically setting the local preference value of BGP routes based on the community value in the received network traffic, thereby causing return traffic to be sent through a symmetric route.

Figure 4E:
FIG. 4E conceptually illustrates the state of a dynamic route on an upstream SDWAN device in accordance with an embodiment of the present invention.

FIG. 4E conceptually illustrates the state of a dynamic route on an upstream SDWAN device in accordance with an embodiment of the present invention. BGP output 480 shows the results of the configuration of FIGS. 4C and 4D. As can be seen, the assigned local preference value (LocPrf) ensures symmetric routing of return traffic. For example, a local preference value of 120 is associated with the top route (via IP address 192.168.1.232) and a local preference value of 100 is associated with the bottom route (via IP address 192.166.14.232), thereby resulting in return traffic being transmitted via the top route.

FIG. 5A is pseudo code 500 for selection by a downstream SDWAN device (e.g., downstream SDWAN device 210) of a neighbor in an SDWAN and configuration of a BGP daemon (e.g., BGP daemon 204) with a selected route-map in accordance with an embodiment of the present invention. In the context of the present example, pseudo code 500, first checks all BGP neighbors one by one to see if a route associated with a BGP neighbor assigned the role of primary has sufficient link quality. If so, then this identified BGP neighbor is selected and the BGP daemon is directed by the controller to use the preferred route-map for the route associated with the identified primary BGP neighbor and the BGP daemon is directed by the controller to use the un-preferred route-map for all other BGP neighbors.

If no BGP neighbor having the primary role satisfies the link quality threshold defined by the SLA (i.e., the first loop does not result in a jump to the SEND COMMAND label), the controller may loop through all BGP neighbors again to identify a route associated with a BGP neighbor assigned the role of secondary that meets the link quality threshold. If such a BGP neighbor is identified, then this BGP neighbor is selected and the BGP daemon is directed by the controller to use the preferred route-map for the route associated with the identified secondary BGP neighbor and the BGP daemon is directed by the controller to use the un-preferred route-map for all other BGP neighbors.

FIG. 5B is pseudo code 520 for storing by a BGP daemon of a downstream SDWAN device whether a specific neighbor is preferred or not in accordance with an embodiment of the present invention. In an embodiment, when the BGP daemon (e.g., BGP daemon 204) receives information from a controller (e.g., SDWAN controller 202) running in the downstream SDWAN device (e.g., downstream SDWAN device 210) regarding a preferred status of a particular BGP neighbor, the BGP daemon stores a flag indicating whether the BGP neighbor is preferred or un-preferred. For example, when the controller directs the BGP daemon to use the preferred route-map for a particular BGP neighbor, the BGP daemon may set a flag "is_preferred" to 1 (true) for the particular BGP neighbor to indicate the route to the particular BGP neighbor is the currently preferred route. Similarly, when the controller directs the BGP daemon to use the un-preferred route-map for a particular BGP neighbor, the BGP daemon may set a flag "is_preferred" to 0 (false) for the particular BGP neighbor to indicate the route to the particular BGP neighbor is not the currently preferred route.

FIG. 5C is pseudo code 540 for advertising routing information by a BGP daemon of a downstream SDWAN device in accordance with an embodiment of the present invention. In the context of the present example, pseudo code 540 loops through each subnet to be advertises to a BGP neighbor. When the BGP neighbor is associated with the preferred route, then routing information for the subnet is advertised to the BGP neighbor based on the preferred route-map and when the BGP neighbor is associated with the un-preferred route, then routing information for the subnet is advertised the BGP neighbor based on the un-preferred route-map.

Figure 6:
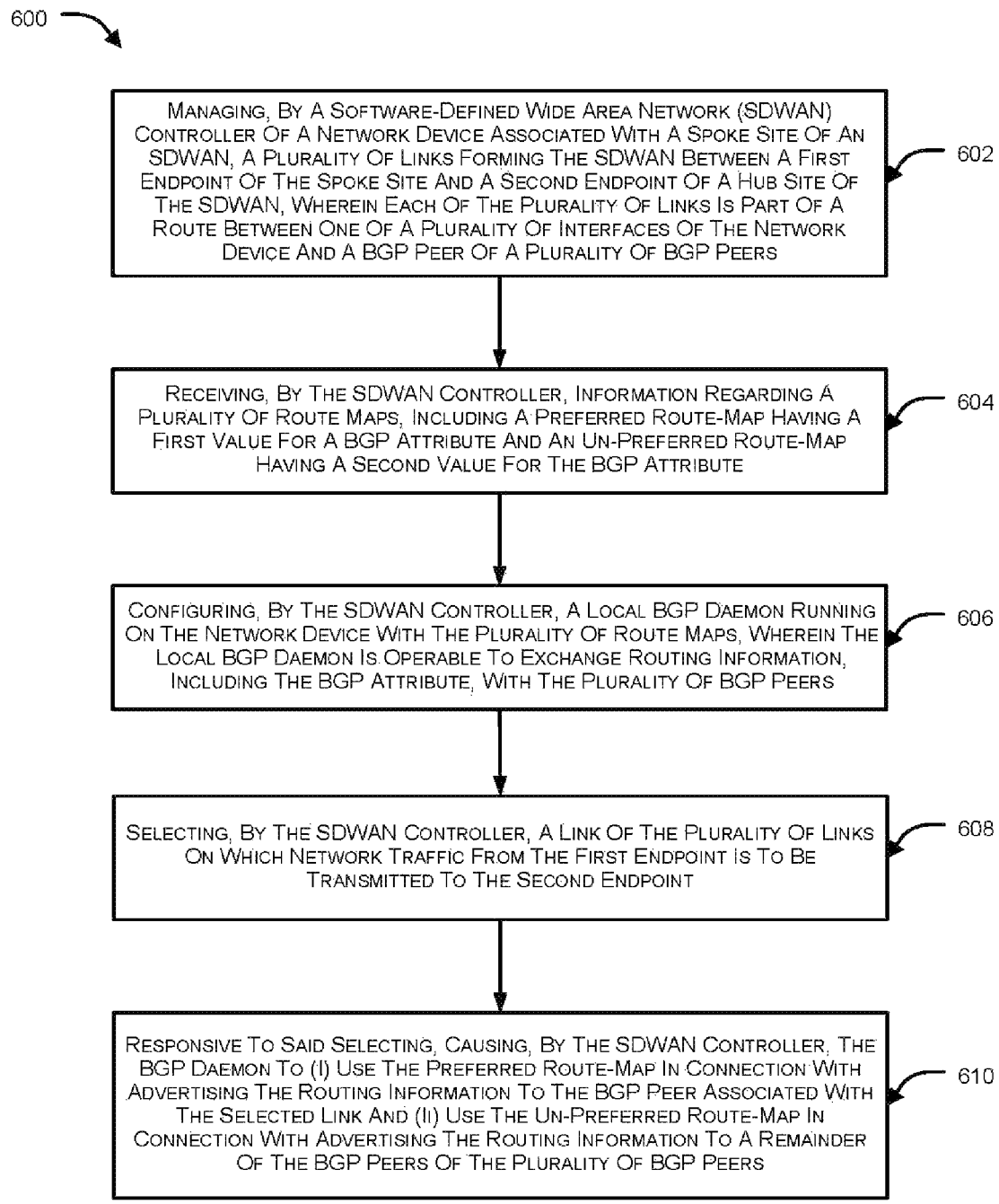
FIG. 6 is a flow diagram illustrating a process performed by an SDWAN controller in accordance with an embodiment of the present invention.

FIG. 6 is a flow diagram illustrating a process performed by an SDWAN controller in accordance with an embodiment of the present invention. The processing described with reference to FIG. 6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 700 described with reference to FIG. 7 below.

At block 602, an SDWAN controller (e.g., SDWAN controller 202) of an SDWAN device (e.g., downstream SDWAN device 210) associated with a spoke site of an SDWAN that manages multiple links that form the SDWAN between a first endpoint of the spoke site and a second endpoint of a hub site of the SDWAN. Each of the various links may be a part of a route between one of multiple interfaces of the SDWAN device and a BGP peer of multiple BGP peers.

At block 604, the SDWAN controller receives information regarding multiple route maps. The information may include a preferred route-map with a first value for a BGP attribute and an un-preferred route-map with a second value for the BGP attribute.

At block 606, the SDWAN controller configures a local BGP daemon (e.g., BGP daemon 204) running on the SDWAN device with multiple route maps. The local BGP daemon may be operable to exchange routing information with the multiple BGP peers. The routing information may also include the BGP attribute.

At block 608, the SDWAN controller selects a link on which network traffic is to be transmitted from the first endpoint to the second endpoint.

Responsive to the selection, at block 610, the SDWAN controller causes the BGP daemon to use the preferred route-map in connection with advertising routing information to the BGP peer associated with the selected link. Also, the SDWAN controller causes the BGP daemon to use the un-preferred route-map in connection with advertising the routing information to a remainder of BGP peers of the multiple BGP peers.

Figure 7:
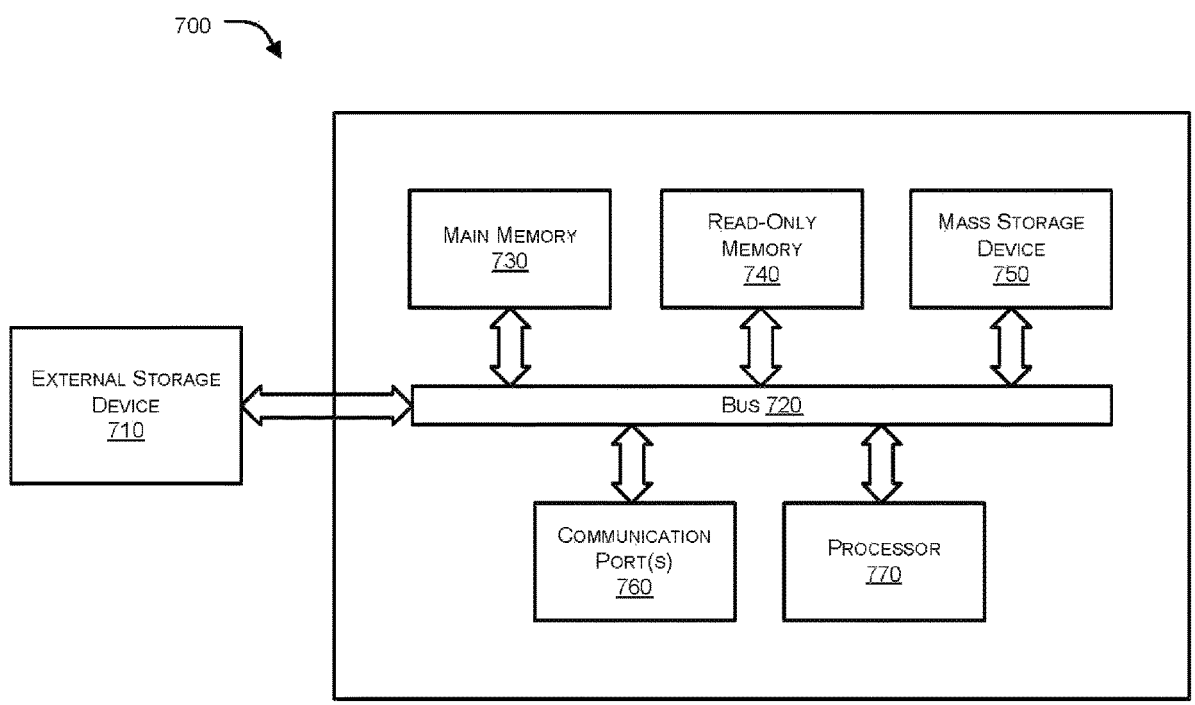
FIG. 7 illustrates an exemplary computer system in which or with which embodiments of the present invention may be utilized.

FIG. 7 illustrates an exemplary computer system 700 in which or with which embodiments of the present invention may be utilized. Computer system 700 may represent a portion of an SDWAN device (e.g., downstream SDWAN device 210 and/or upstream SDWAN device 212).

As shown in FIG. 7, computer system includes an external storage device 710, a bus 720, a main memory 730, a read only memory 740, a mass storage device 750, a communication port 760, and a processor 770.

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   managing, by a Software-Defined Wide Area Network (SDWAN) controller of a network device associated with a spoke site of an SDWAN, a plurality of links between a first endpoint of the spoke site and a second endpoint of a hub site of the SDWAN, wherein each of the plurality of links spans between one of a plurality of interfaces of the network device and a BGP peer of a plurality of BGP peers;

receiving, by the SDWAN controller, information regarding a plurality of route maps, including a preferred route-map having a first value for a BGP attribute and an un-preferred route-map having a second value for the BGP attribute;

configuring, by the SDWAN controller, a local BGP daemon running on the network device with the plurality of route maps, wherein the local BGP daemon is operable to exchange routing information, including the BGP attribute, with the plurality of BGP peers;

selecting, by the SDWAN controller, a link of the plurality of links on which network traffic from the first endpoint is to be transmitted to the second endpoint; and responsive to said selecting, causing, by the SDWAN controller, the BGP daemon to (i) use the preferred route-map in connection with advertising the routing information to the BGP peer associated with the selected link and (ii) use the un-preferred route-map in connection with advertising the routing information to a remainder of the BGP peers of the plurality of BGP peers.

2. The method of claim 1, wherein prior to said selecting comprises for each of the plurality of links, periodically performing, by the SDWAN controller, a health check on the link.

3. The method of claim 1, wherein the plurality of BGP peers convert a value of the BGP attribute contained in the routing information received from the BGP daemon to a local preference value in connection with determining a return route for network traffic destined for the first endpoint.

4. The method of claim 3, wherein a remote BGP router selects a route-map having a higher local preference value in connection with determining the return route.

5. The method of claim 1, wherein the BGP attribute comprises a BGP community attribute.

6. The method of claim 5, wherein the first value comprises a higher value of the BGP community attribute than the second value.

7. The method of claim 1, wherein the SDWAN controller communicates with the BGP daemon through an inter-process communication mechanism.

8. A non-transitory computer-readable storage medium embodying a set of instructions, which when executed by one or more processors of a Software-Defined Wide Area Network (SDWAN) controller of a network device, causes the one or more processors to perform a method comprising:

managing, by the Software-Defined Wide Area Network (SDWAN) controller of a network device associated with a spoke site of an SDWAN, a plurality of links between a first endpoint of the spoke site and a second endpoint of a hub site of the SDWAN, wherein each of the plurality of links spans between one of a plurality of interfaces of the network device and a BGP peer of a plurality of BGP peers;

receiving, by the SDWAN controller, information regarding a plurality of route maps, including a preferred route-map having a first value for a BGP attribute and an un-preferred route-map having a second value for the BGP attribute;

configuring, by the SDWAN controller, a local BGP daemon running on the network device with the plurality of route maps, wherein the local BGP daemon is operable to exchange routing information, including the BGP attribute, with the plurality of BGP peers;

selecting, by the SDWAN controller, a link of the plurality of links on which network traffic from the first endpoint is to be transmitted to the second endpoint; and responsive to said selecting, causing, by the SDWAN controller, the BGP daemon to (i) use the preferred route-map in connection with advertising the routing information to the BGP peer associated with the selected link and (ii) use the un-preferred route-map in connection with advertising the routing information to a remainder of the BGP peers of the plurality of BGP peers.

9. The non-transitory computer-readable storage medium of claim 8, wherein prior to said selecting comprises for each of the plurality of links, periodically performing, by the SDWAN controller, a health check on the link.

10. The non-transitory computer-readable storage medium of claim 8, wherein the plurality of BGP peers convert a value of the BGP attribute contained in the routing information received from the BGP daemon to a local preference value in connection with determining a return route for network traffic destined for the first endpoint.

11. The non-transitory computer-readable storage medium of claim 10, wherein a remote BGP router selects a route-map having a higher local preference value in connection with determining the return route.

12. The non-transitory computer-readable storage medium of claim 8, wherein the BGP attribute comprises a BGP community attribute.

13. The non-transitory computer-readable storage medium of claim 12, wherein the first value comprises a higher value of the BGP community attribute than the second value.

14. The non-transitory computer-readable storage medium of claim 8, wherein the SDWAN controller communicates with the BGP daemon through an inter-process communication mechanism.

15. A system comprising:

one or more processors of a Software-Defined Wide Area Network (SDWAN) controller associated with a spoke site of an SDWAN, where the one or more processors are configured to:

manage a plurality of links between a first endpoint of the spoke site and a second endpoint of a hub site of the SDWAN, wherein each of the plurality of links spans between one of a plurality of interfaces of the network device and a BGP peer of a plurality of BGP peers;

receive information regarding a plurality of route maps, including a preferred route-map having a first value for a BGP attribute and an un-preferred route-map having a second value for the BGP attribute;

configure a local BGP daemon running on the system with the plurality of route maps, wherein the local BGP daemon is operable to exchange routing information, including the BGP attribute, with the plurality of BGP peers;

select a link of the plurality of links on which network traffic from the first endpoint is to be transmitted to the second endpoint; and in response to said selecting, cause the BGP daemon to (i) use the preferred route-map in connection with advertising the routing information to the BGP peer associated with the selected link and (ii) use the un-preferred route-map in connection with advertising the routing information to a remainder of the BGP peers of the plurality of BGP peers.

16. The system of claim 15, wherein prior to said selection comprises for each of the plurality of links, periodically performing, by the SDWAN controller, a health check on the link.

17. The system of claim 15, wherein the plurality of BGP peers convert a value of the BGP attribute contained in the routing information received from the BGP daemon to a local preference value in connection with determining a return route for network traffic destined for the first endpoint.

18. The system of claim 17, wherein a remote BGP router selects a route-map having a higher local preference value in connection with determining the return route.

19. The system of claim 15, wherein the BGP attribute comprises a BGP community attribute.

20. The system of claim 19, wherein the first value comprises a higher value of the BGP community attribute than the second value.

\* \* \* \* \*